United States Patent
Kluss et al.

(10) Patent No.: US 10,962,153 B2
(45) Date of Patent: Mar. 30, 2021

(54) TERMINAL COMPONENT FOR PLUMBING CONFIGURATION

(71) Applicant: Reliance Worldwide Corporation, Atlanta, GA (US)

(72) Inventors: William Vernon Kluss, Woombye (AU); Alexander Rycroft, Atlanta, GA (US); Samantha Ann Kelly, Mount Ephraim, NJ (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 184 days.

(21) Appl. No.: 16/043,929

(22) Filed: Jul. 24, 2018

(65) Prior Publication Data
US 2020/0032935 A1 Jan. 30, 2020

(51) Int. Cl.
| | |
|---|---|
| *F16L 55/10* | (2006.01) |
| *F16L 21/02* | (2006.01) |
| *E03C 1/02* | (2006.01) |
| *F16L 37/084* | (2006.01) |

(52) U.S. Cl.
CPC .............. *F16L 21/022* (2013.01); *E03C 1/02* (2013.01); *F16L 37/0841* (2013.01); *E03C 2001/026* (2013.01)

(58) Field of Classification Search
CPC ..... F16L 21/022; F16L 37/0841; F16L 55/11; F16L 55/1157
USPC .................................................. 138/89, 96 R
See application file for complete search history.

(56) References Cited

U.S. PATENT DOCUMENTS

| | | | | |
|---|---|---|---|---|
| 2,218,581 A | * | 10/1940 | Levan | A47C 7/002 220/243 |
| 2,363,408 A | * | 11/1944 | Gallop | F16J 13/12 138/89 |
| 2,512,041 A | * | 6/1950 | Steele | F16L 55/1286 220/236 |
| 2,625,955 A | * | 1/1953 | Day | F16L 55/1152 138/89 |
| 3,307,552 A | * | 3/1967 | Strawn | A61M 39/20 604/256 |

(Continued)

FOREIGN PATENT DOCUMENTS

| | | |
|---|---|---|
| DE | 29706377 U1 | 6/1997 |
| EP | 1 219 883 A2 | 7/2002 |

(Continued)

OTHER PUBLICATIONS

International Search Report and Written Opinion issued in International Application No. PCT/US2019/039964 dated Sep. 24, 2019.

*Primary Examiner* — James F Hook
(74) *Attorney, Agent, or Firm* — Foley & Lardner LLP

(57) ABSTRACT

A terminal portion for sealing an end of a conduit includes a body including a first end having a first diameter and a second end having a second diameter, the first diameter having a smaller size than the second diameter. The terminal portion further includes an internal ring disposed over and around the first end of the body, and a sleeve disposed over the body and the internal ring. The sleeve is structured to contain an outer portion of the end of the conduit and is dimensioned to accommodate the first end of the body and the conduit. At least one inner sleeve contained in the sleeve houses the body.

18 Claims, 12 Drawing Sheets

(56) References Cited

U.S. PATENT DOCUMENTS

| | | | |
|---|---|---|---|
| 4,809,751 A * | 3/1989 | McKenzie | F16L 55/1286 |
| | | | 138/89 |
| 5,437,483 A | 8/1995 | Umezawa | |
| 6,223,776 B1 * | 5/2001 | Glassell | F16L 55/10 |
| | | | 138/89 |
| 6,343,814 B1 | 2/2002 | Bucher et al. | |
| 7,850,030 B2 * | 12/2010 | Lin | B65D 39/12 |
| | | | 138/89 |
| 2003/0168856 A1 | 9/2003 | Kaminski et al. | |
| 2007/0040378 A1 | 2/2007 | Sheppard et al. | |
| 2007/0075542 A1 * | 4/2007 | Glaze | F16L 37/0915 |
| | | | 285/322 |
| 2008/0191475 A1 | 8/2008 | Postler | |
| 2012/0266971 A1 * | 10/2012 | Nourian | F16L 55/1108 |
| | | | 137/15.08 |
| 2016/0327196 A1 | 11/2016 | Gledhill et al. | |

FOREIGN PATENT DOCUMENTS

| | | |
|---|---|---|
| WO | WO-2015/024993 A1 | 2/2015 |
| WO | WO-2016/058914 A1 | 4/2016 |

\* cited by examiner

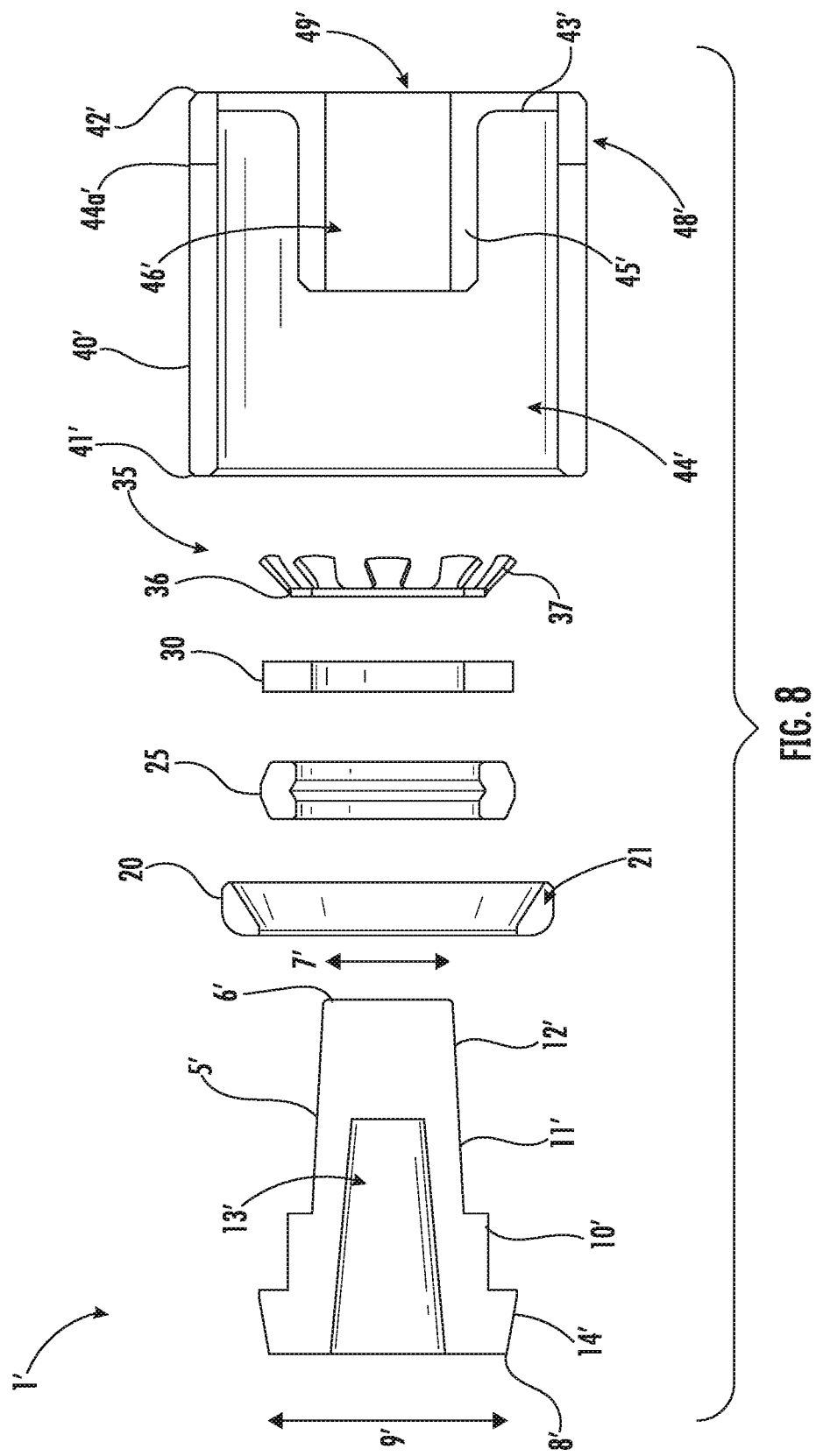

TERMINAL COMPONENT FOR PLUMBING CONFIGURATION

FIELD

The present application relates generally to the field of sealing conduits. Specifically, the present application relates to sealing conduits for plumbing applications.

BACKGROUND

During rough plumbing, terminal components are installed on open ends of a pipe in a plumbing system in order to be able to check the plumbing system for leaks. A wide variety of end fittings are available, which are configured to grip or hold the end of the pipe when the fitting is installed on the end of the pipe to secure the assembly. Some end fittings grip the pipe once they are crimped, while other end fitting grip the pipe by means of a grab ring or by glue, threads, or soldering, for example. However, such components often require complicated assembly processes, expensive tools and significant labor expenditures.

SUMMARY

The present disclosure relates to end fittings which are conducive for a streamlined assembly process, thereby enabling efficiency gains and cost reductions (such as cost reductions associated with labor in the field) for rough plumbing installations during building construction.

According to one aspect, a terminal portion for sealing an end of a conduit includes a body including a first end having a first diameter and a second end having a second diameter, the first diameter having a smaller size than the second diameter; an internal ring disposed over and around the first end of the body; and a sleeve disposed over the body and the internal ring. The sleeve is structured to contain an outer portion of the end of the conduit, at least one inner sleeve dimensioned to accommodate the first end of the body, and a portion dimensioned to accommodate the conduit, the at least one inner sleeve housing the body.

According to an another aspect, an assembly includes a tubular member having an end portion, the end portion having an outer diameter and an inner diameter; a stopper comprising a body; an internal ring provided concentrically with respect to the body; and a sleeve disposed over the body and the internal ring, the sleeve being configured to house therein the outer diameter of the end portion of the tubular member, and the sleeve being further configured to house the internal ring and the body.

According to another aspect, a method of assembling a stopper on an end of a tubular member in a plumbing system includes the steps of arranging the tubular member within the plumbing system; inserting an end of the tubular member into a first end of the stopper such that an outer diameter of the end of the tubular member fits within an inner diameter of the stopper; pressing a protection ring to a second end of the stopper such that the protection ring is visible through at least one window disposed in an outer wall of the second end of the stopper; and sealing the end of the tubular member and the stopper. An internal ring housed in the stopper is configured to grip the end of the tubular member and prevent the tubular member from removing from the stopper.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 8 is an exploded assembly view of the end stop assembly shown in FIG. 7.

DETAILED DESCRIPTION

Following below are more detailed descriptions of various concepts related to and implementations of exemplary devices and methods. The various concepts introduced above and discussed in greater detail below may be implemented in any of numerous ways, as the described concepts are not limited to any particular manner of implementation.

Various aspects of end stop devices and methods described herein achieve technical advantages including but not limited to those noted herein. Among other things, at least one implementation relates to an end stop device of a plumbing configuration, hereinafter referred to as a terminal component. The terminal component is configured to both grip and seal a conduit. The conduit may be a tubular member or fitting for gas or plumbing. The terminal component may be used either permanently or temporarily, as a disposable component.

The terminal component employs an internal ring (e.g., an internal grab ring, etc.) to keep the conduit on a fitting in the plumbing system. Because flow through the fitting itself is not relevant in terms of performance (i.e., fluid dynamic performance), the internal ring is not limited in terms of size. Relatively small internal rings may be used, which allows for reduced material and manufacturing costs. Additionally, the terminal component permits immediate visual inspection of whether the conduit has been correctly assembled with the terminal component such that the conduit is adequately gripped and sealed by the terminal component. Additionally, the terminal component according to implementations described herein allows for easy and fast insertion of the conduit, such that if a pipe cutting tool is used on the conduit, there is no need to subsequently chamfer an end of the conduit.

Additionally, the assembly process for the end stop device herein disclosed can allow for the creation of any suitable fit between a body and a sleeve. For example the fit between the body and the sleeve may be, but is not limited to, an interference fit, a threaded fit, a snap fit, or a fit using an adhesive (e.g., glue), for example.

Figure 1:
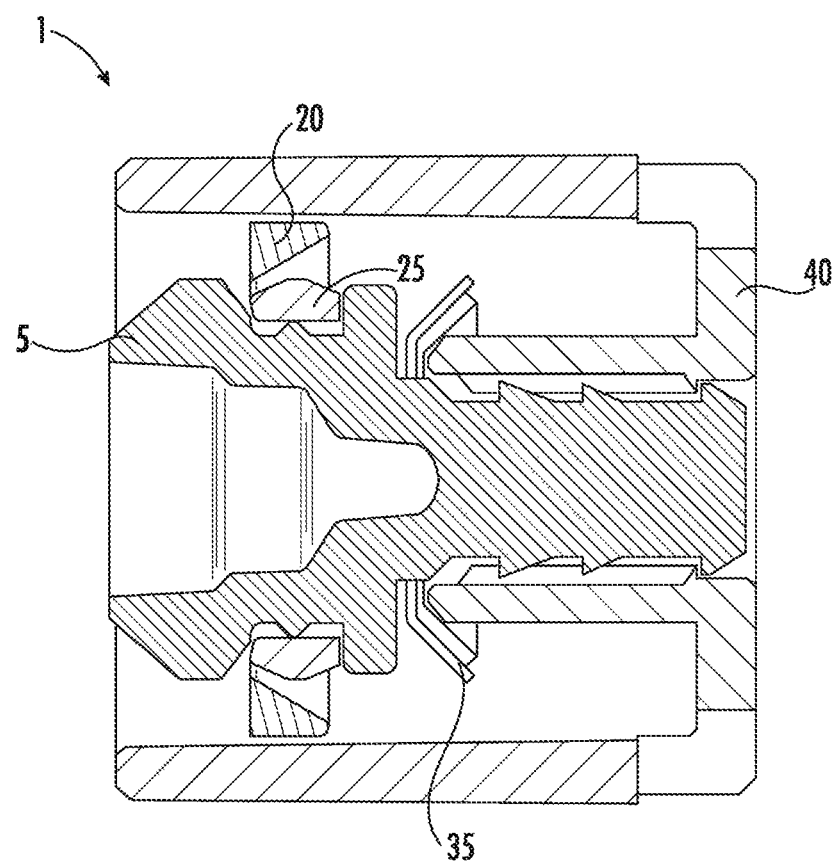
FIG. 1 is a side cross-sectional view of an end stop assembly, according to a first exemplary implementation.

FIG. 1 depicts a terminal portion for sealing an end of a conduit (e.g., a tubular member or a fitting) according to an implementation. The terminal portion for sealing an end of a conduit is designed to make a connection with the conduit quickly and economically, providing for ease of use when installing or inserting the terminal portion on an end of the conduit. The conduit may be formed of a polymer fitting (e.g., a pipe) such as cross-linked polyethylene ("PEX"). The terminal portion is designed to cover or fit various sizes of conduits (e.g., all sizes of plumbing and gas fittings). Accordingly, the terminal portion 1 may be of any suitable size to fit with the conduit.

Figure 2:
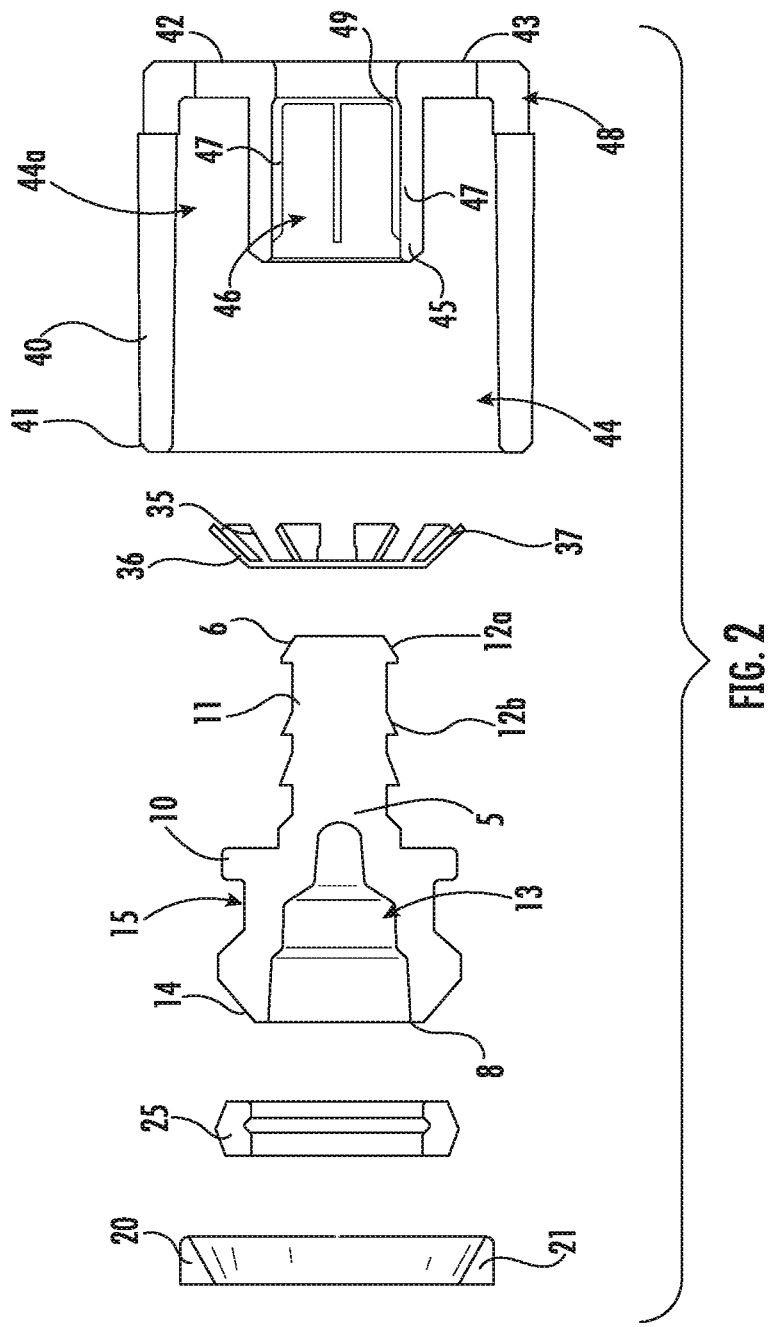
FIG. 2 is an exploded assembly view of the end stop assembly shown in FIG. 1.
Figure 3:
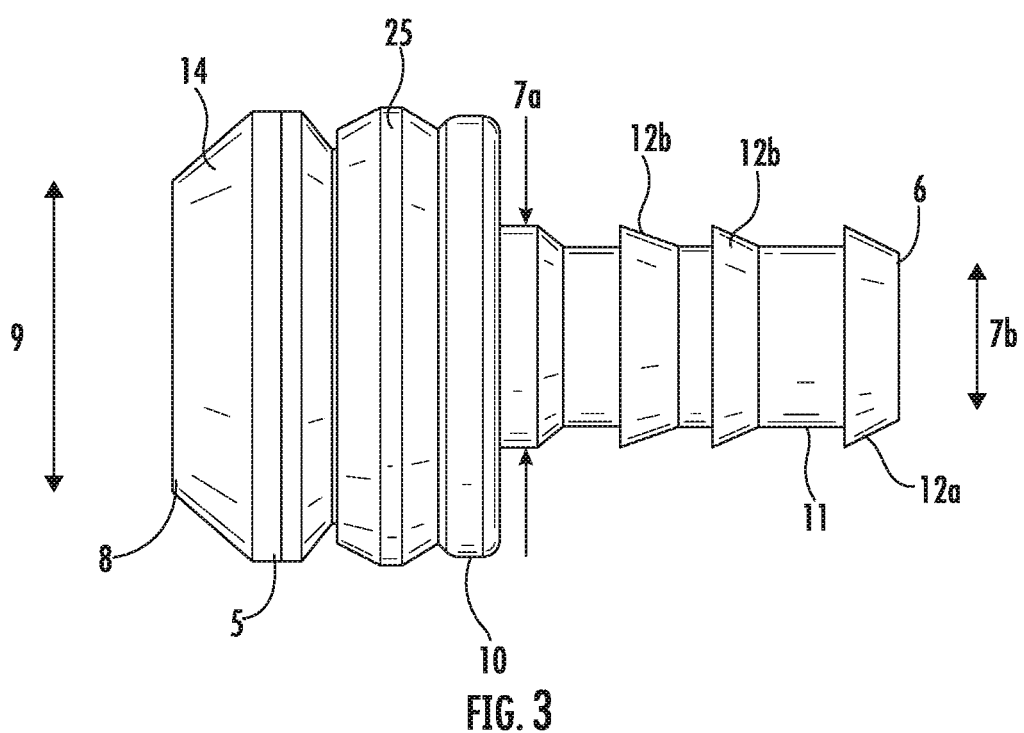
FIG. 3 is a side view of a body and a sealing ring of the end stop assembly shown in FIG. 1.
Figure 4A:
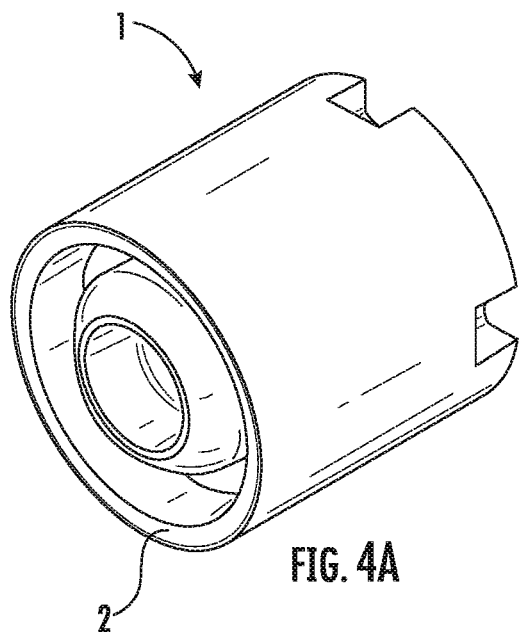
FIG. 4A is a rear perspective view of the end stop assembly shown in FIG. 1.
Figure 4B:
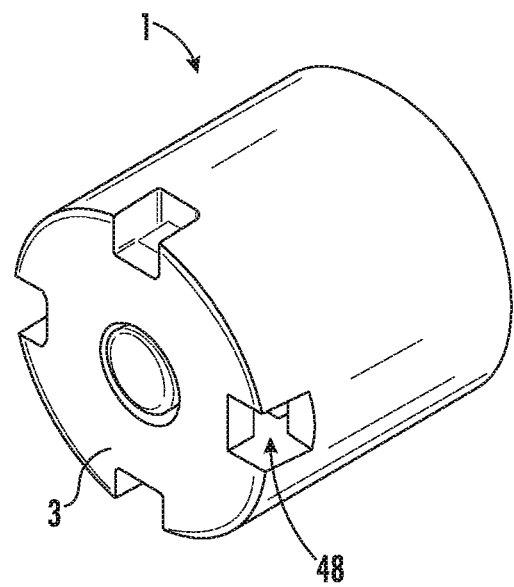
FIG. 4B is a front perspective view of the end stop assembly shown in FIG. 1.

As shown in FIG. 1, an exemplary implementation of terminal portion 1 (e.g., a stopper or end stop) includes a body 5, a protection ring 20, a sealing ring 25, an internal ring 35, and a sleeve 40. An exploded assembly of the terminal portion 1 according to the exemplary implementation is shown in FIG. 2. The body 5 includes a groove 15 configured to receive the sealing ring 25 (FIG. 3 shows the body 5 with the sealing ring 25 positioned on the groove 15 of the body 5). The terminal portion 1, when assembled, includes a first, relatively open end 2 and a second, relatively closed end 3, as shown in FIGS. 4A and 4B. The structure of the terminal portion 1 and components thereof are described in more detail below.

Referring to FIGS. 2 and 3, the body 5 of the terminal portion 1 includes a first end 6 having a first diameter 7b and a second end 8 having a second diameter 9. In at least one implementation, the first diameter 7b of the first end 6 may have a smaller size than the second diameter 9 of second end 8, although in other implementations, the first diameter 7b may be of a same size as the second diameter 9, or the first diameter 7b may be of a larger size than the second diameter 9. The body 5 also includes a middle diameter 7a, which, according to one example, is larger than the first diameter 7b but smaller than the second diameter 9. Alternatively, the middle diameter 7a may be of a same size as the first diameter 7b and the second diameter 9, the middle diameter 7a may be of a smaller size than the first diameter 7b, or the middle diameter 7a may be larger than the second diameter 9. For example, in an exemplary implementation in which the internal ring 35 is a split grab ring, the first diameter 7b may exceed the second diameter 7a.

Figure 5:
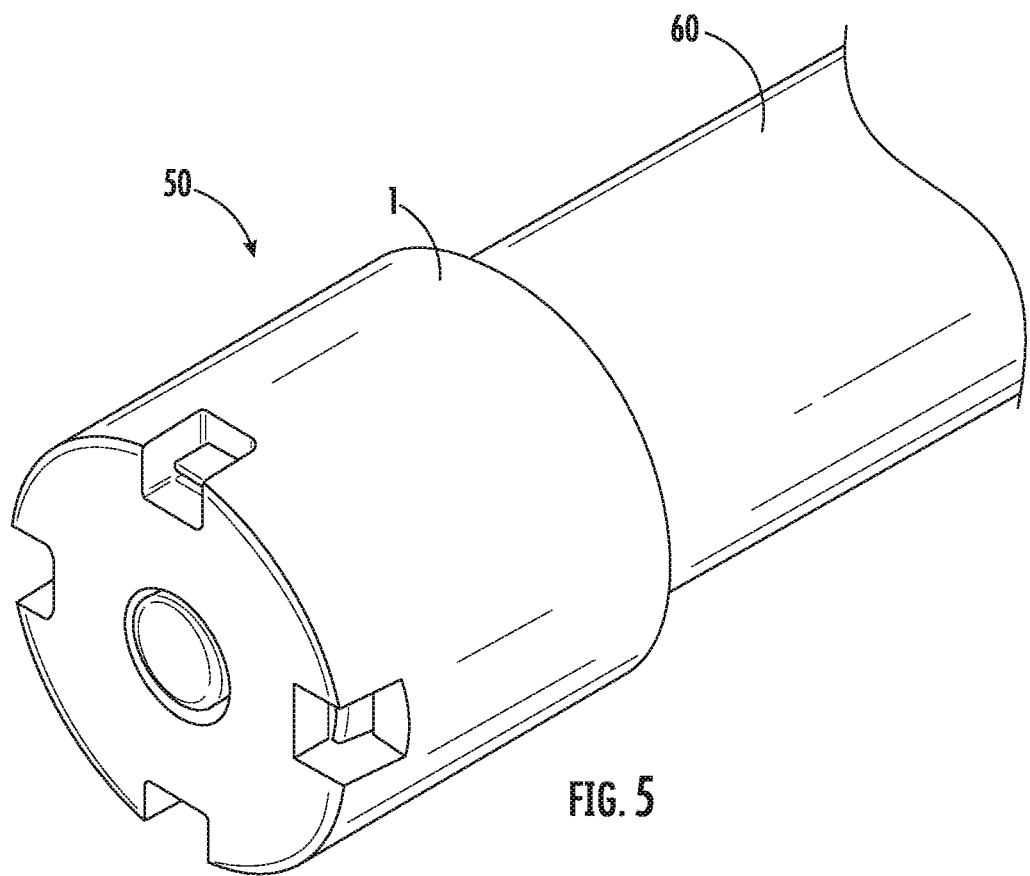
FIG. 5 is a front perspective view of the end stop assembly shown in FIG. 1 coupled to a conduit.

The body 5 also includes a groove 15 which is configured to receive and support the sealing ring 25 and thereby provide a seal on an inside of the conduit 60 (shown in FIG. 5) when an end 61 (shown in FIG. 6A) of the conduit 60 is inserted into the terminal portion 1. The conduit 61 may be inserted into the terminal portion 1 such that end 61 of the conduit 60 is provided over and around second end 8 of the body 5.

According to one aspect, the body 5 also includes a portion 11 which includes a plurality of projections (which may be in the form of barbs, among other structures) 12b disposed on an external surface of the portion 11 of the body 5. According to one aspect, the plurality of projections may include two or more barbs. The plurality of projections are configured to engage with (e.g., by gripping) a plurality of extending structures (extensions) 47 disposed within the inner sleeve 45 of the sleeve 40 (described below). The extending structures 47 may be formed as, but are not limited to, ribs. The first end 6 of the body 5 may also include a projection 12a which is configured to engage with an at least one inner sleeve step 49 (e.g., an inner protrusion) of the inner sleeve 45 of the sleeve 40 (described below). However, it is to be understood that the present disclosure is not particularly limited to this aspect. For example, the body 5 and the sleeve 40 may be in, but are not limited to, configurations that achieve various types of fits between the body 5 and the sleeve 40. By way of example, the fit between the body 5 and the sleeve 40 may be, but are not limited to, an interference fit, a threaded fit, a snap fit, a fit using an adhesive (e.g., glue), for instance. As an alternative example, the body 5 and the sleeve 40 may not be physically joined together, provided that the internal ring 35 is held in place on the body 5 (for example, where the internal ring 35 is a split grab ring, as described below in more detail).

The body 5 also includes a body step 10. The body ramp 14 and the body step 10 define the groove 15 which is configured to receive the sealing ring 25. The sealing ring 25 is configured to seal the body 5 within sleeve 40 when the end 61 of the conduit 60 is inserted into the terminal portion 1. The body 5 also includes a hollow internal portion 13.

The protection ring 20 is configured to compress the sealing ring 25 when the conduit 60 is inserted into the terminal portion 1 and thereby provide a barrier to protect against contamination by isolating sealing ring 25 from an external environment. The protection ring 20 is configured to change the shape of the sealing ring 25 by compressing the sealing ring 25 when the conduit 60 is inserted into the terminal portion 1, while the protection ring 25 does not change shape itself. More specifically, the protection ring 20 includes a chamfer 21 which is configured to compress the sealing ring 20 when the end 61 of the conduit 60 is inserted into the terminal portion 1. The protection ring 20 is further configured to provide an indicator when the conduit 60 is fully inserted into the terminal portion 1. For example, the protection ring 20 is colored (e.g., colored with a bright and/or highly reflective color) to allow for easy visualization of location of the protection ring 20 in the terminal portion 1, and thereby indicate an installation state of the terminal portion 1 on the conduit 60. Visual inspection of the protection ring 20 readily reveals whether the terminal portion 1 is correctly installed. For example, when the color of the protection ring 20 is readily visible, this indicates to an observer that the installation has been performed correctly. Furthermore, because the protection ring 20 includes the chamfer 21, there is no need to provide a chamfer on the end 61 of the conduit 60 when inserting the end 61 into the terminal portion 1.

When the conduit 60 is inserted into the terminal portion 1, the conduit 60 pushes on the protection ring 20 such that, as indicated above, when the protection ring 20 comes into contact with the sealing ring 25, the protection ring 20 compresses the sealing ring 25. Further, when the sealing ring 25 is compressed, the end 61 of conduit 60 passes over the sealing ring 25, thereby providing a seal on the end 61. Accordingly, the sealing ring 25 is disposed within the groove 15 of the body 5, and thereby provides a seal to the end 61 of the conduit 60 when it is inserted into the terminal portion 17b.

The internal ring 35 is configured to hold (e.g., grab) the conduit 60 such that the conduit 60 is held and remains fixed within the terminal portion 1. Specifically, the internal ring 35 is configured to grip the conduit 60 on an inner diameter of the conduit 60 rather than on an outer diameter of the conduit 60. Configuring the internal ring 35 to grip the conduit 60 on an inner diameter of the conduit 60 allows the internal ring 35 to be formed with a relatively smaller diameter, thereby allowing the overall size of the terminal portion 1 to be smaller, and reducing material costs. The internal ring 35 includes a first end 36 configured to rest on the portion 11 of the body 5 such that the first end 36 is substantially flush with the body step 10 of the body 5. The internal ring 35 also includes a plurality of protrusions 37 on an opposite end of the internal ring 35. As shown in FIGS. 1-2, the protrusions 37 are bent inwards and extend radially out from a centerline of the internal ring 35. Although the internal ring 35 shown in FIGS. 1-2 is shown as a continuous ring, the internal ring 35 is not particularly limited to this implementation. For example, the internal ring 35 can be a split ring that includes a cut in the first end 36 such that the internal ring 35 is expandable and is configured to be positioned in a groove on the body 5.

The plurality of protrusions 37 are configured to grip an inner surface or diameter of the conduit 60 such that the conduit 60 is held in place relative to the terminal portion 1 by the plurality of protrusions 37 of the internal ring 35. In one example, the internal ring 35 is a grab ring. The internal ring 35 also includes a hollow inner portion which is configured to rest on end 6 of the body 5. The internal ring 35 is made of any suitable material, for example, stainless steel. The internal ring 35 is configured to capture all of the fitting loads between the sealing ring 25 and the internal ring 35. After the conduit 60 is inserted into the terminal portion 1 and the system is pressurized, fluid flowing through the conduit 60 generates fluid loads which act on the terminal portion 1 in a direction perpendicular to the end 61 of the conduit 60 (that is, a direction parallel to the direction arrow 65 shown in FIG. 6A). The internal ring 35 acts against the fluid load by grabbing an inner surface of the conduit 60, thereby keeping the terminal portion 1 in place on the end 61 of the conduit 60, while the sealing ring 245 prevents fluid leakage from the terminal portion 1 and the conduit 60. Because of this configuration of the internal ring 35, the only external component required when the conduit 60 is inserted into the terminal portion 1 is a sleeve 40 (described in more detail below) which supports the conduit 60.

The sleeve 40 (which may also be referred to herein as an external tube liner or retainer) is configured to house the body 5, the protection ring 20, the sealing ring 25, and the internal ring 35. The sleeve 40 is further configured to house the end 61 of the conduit 60 in a hollow portion 44 of the sleeve 40. The sleeve 40 is configured to be disposed concentrically over or around the body 5, the protection ring 20, the sealing ring 25, and the internal ring 35, by indicating an installation state. The sleeve 40 is made of any suitable material. For example, the sleeve 40 is made of molded plastic. In at least one implementation, the sleeve 40 comprises a material that is greater in stiffness than the conduit. In another implementation, the sleeve 40 is made of PEX and has a thickness greater than that of the PEX from which the conduit is formed, so as to be relatively stiffer.

Referring to FIG. 2, the sleeve 40 includes a first, open end 41 configured to receive and house the body 5, the protection ring 20, the sealing ring 25, the internal ring 35, and the end 61 of the conduit 60. The first, open end 41 is adjacent to the inner hollow portion 44 of the sleeve 40. The sleeve 40 also includes a second end 42. According to one aspect, the second end 42 of the sleeve 40 is closed by outer wall 43, except for a plurality of slots 48 in the wall 43. The plurality of slots 48 are configured to allow for easy visualization of the location of the protection ring 20 within the sleeve 40 to verify whether the conduit 60 has been successfully installed in the terminal portion 1. The plurality of slots 48 may include, as one example, four slots, but the present disclosure is not particularly limited to this implementation. For example, the plurality of slots 48 may include an odd or even number of slots (e.g., two, three, four, five, six, seven, or eight slots).

The sleeve 40 also includes inner sleeve 45 which defines an inner cavity 46. According to one aspect, the inner sleeve 45 is configured to house the body 5. In at least one implementation, the body 5 and the inner sleeve 45 may be coupled together via a specific fit, although such a fit may not be present in other implementations. For example, the body 5 and the inner sleeve 45 may be, but are not limited to, being coupled via an interference fit, a threaded fit, a snap fit, a fit using an adhesive (e.g., glue), or any other type of fit. In the case of an interference fit, due to the interference fit, the sleeve 40 holds the body 5 securely in place in the sleeve 40 when the terminal portion 1 is assembled. Accordingly, the inner sleeve 45 includes a plurality of extending structures (e.g., ribs) 47 disposed within the inner sleeve 45. The plurality of extending structures 47 are configured to engage with the plurality of projections 12b of the body 5 and thereby secure the body 5 within the sleeve 40. The extending structures 47 and the projections (e.g., barbs) 12b are configured to create an interference fit. According to one aspect, the plurality of extending structures 47 may include half a dozen extending structures, but the present disclosure is not particularly limited to this implementation. For example, the plurality of extending structures 47 may include between 2-8 extending structures. The inner sleeve 45 also includes at least one inner sleeve step 49 disposed towards the second end 42 of the sleeve 40. In at least one implementation, the at least one inner sleeve step 49 is configured to engage with the projection 12a of the first end 6 of the body 5 so as to create a fit between the barb 12a and the at least one inner sleeve step 49. The inner sleeve 45 is also configured to hold the internal ring 35 in place on the body 5.

Figure 6A:
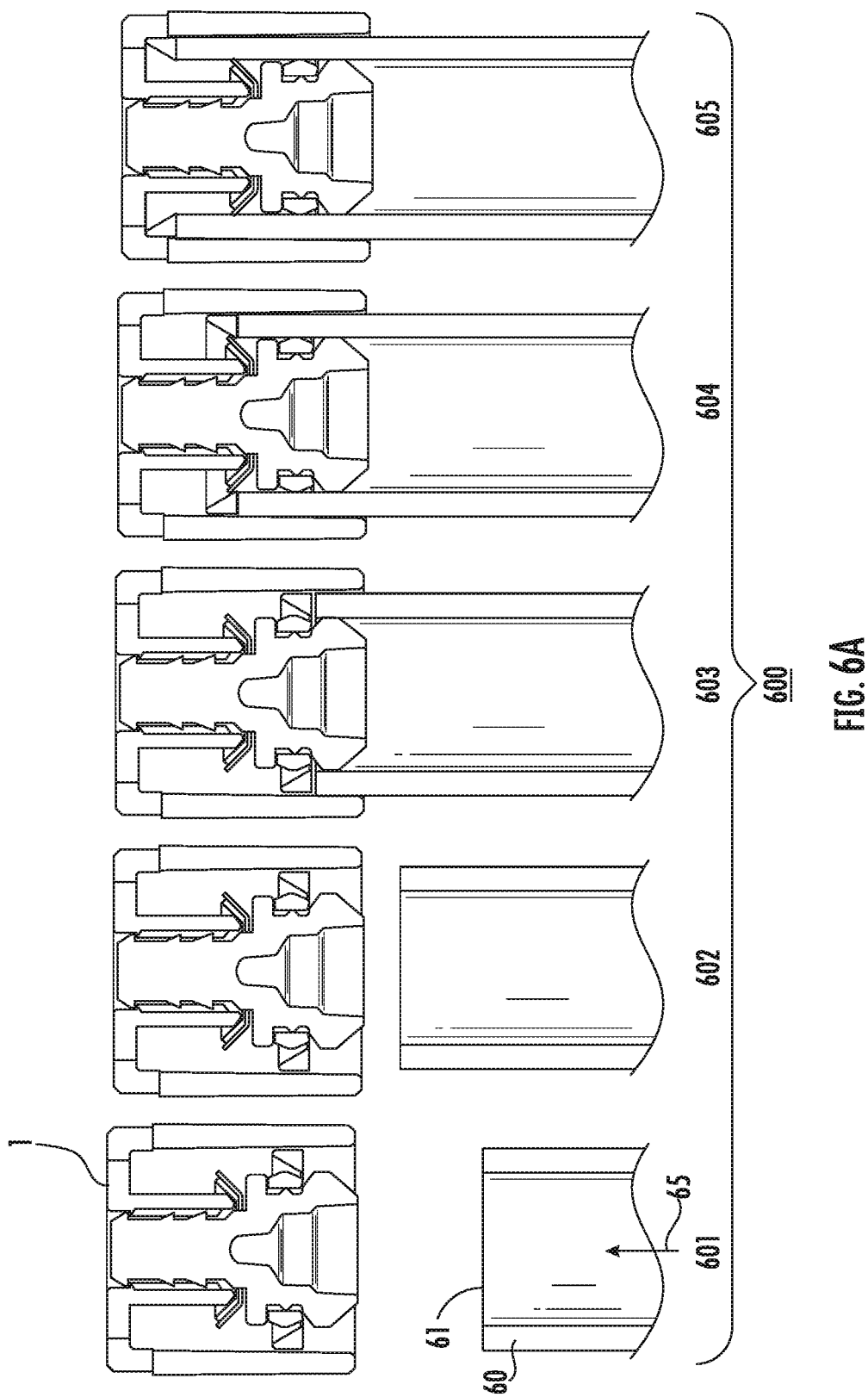
FIG. 6A is a sequence of side cross-sectional views illustrating assembly of an end stop assembly on a conduit according to an exemplary implementation.

The inner hollow portion 44 of the sleeve 40 is configured to receive and hold the end 61 of the conduit 60 and the protection ring 20 when the end 61 of the conduit 60 is inserted into the terminal portion 1 during the rough plumbing process. For example, the inner hollow portion 44 is configured to allow the protection ring 20 to travel from the first end 41 of the sleeve 40 to the second end 42 of the sleeve 40 as the end 61 of the conduit 60 is being inserted into the sleeve 40, as shown in FIG. 6A. The inner sleeve 45 also defines a portion 44a of the inner hollow portion 44. The portion 44a is defined by an outer surface of inner the sleeve 45 and an inner surface of the sleeve 40. The portion 44a is configured to receive and hold the end 61 of the conduit 60 and the protection ring 20 when the end 61 of the conduit 60 is inserted into the terminal portion 1 during the rough plumbing process. The portion 44a is positioned so as to extend along a top and a bottom of cavity 46, and along a first lateral side of the cavity 46 which is opposite to a second lateral side of the cavity 46 facing the wall 43.

As shown in FIG. 6A, a method 600 of assembling a configuration includes arranging the terminal portion 1 and the conduit 60. The end 61 of the conduit 60 is inserted into the open end 2 of the terminal portion 1 until the end 61 of the conduit 60 presses the protection ring 20 up against the end 42 of the sleeve 40 such that a location of the protection ring 20 is visible through the plurality of slots 48 in the sleeve 40, as shown in FIG. 6A. The internal ring 35 grips and holds an inner surface of the conduit 60, holding the assembly together. Steps 601-605 are described below in more detail with regard to FIG. 6B.

Figure 6B:
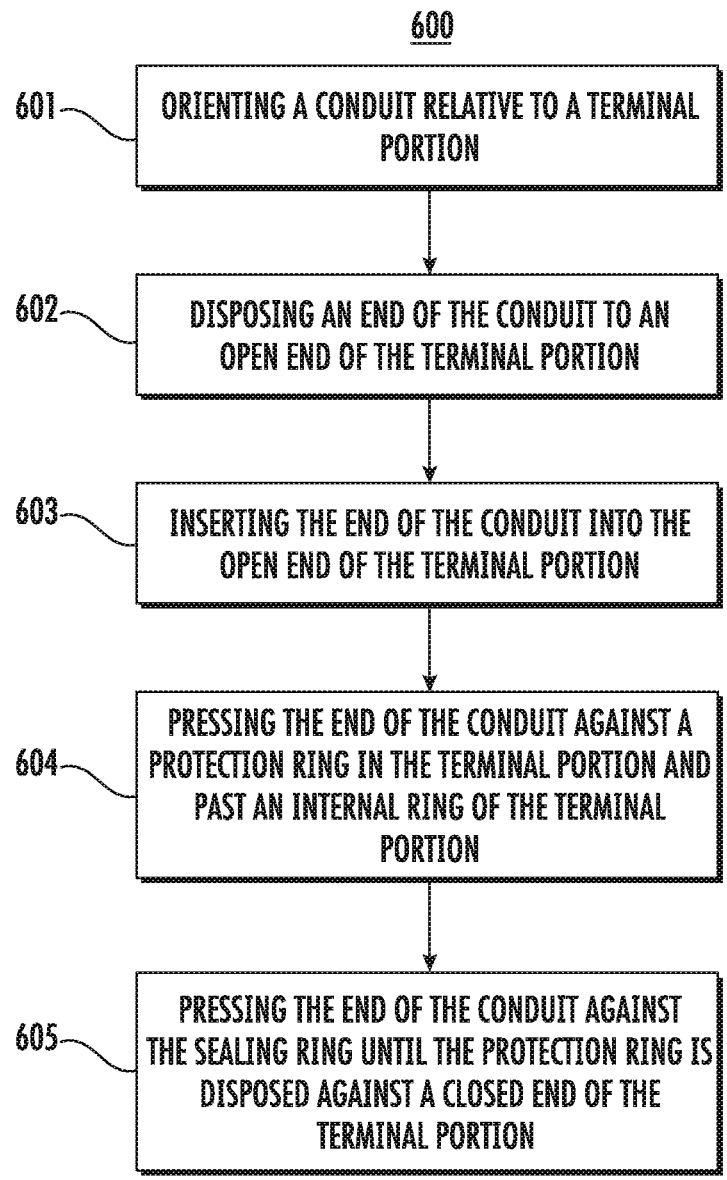
FIG. 6B is a diagram illustrating a method of assembling the configuration shown in FIG. 6A.

As shown in FIG. 6B, an exemplary method 600 of assembling a configuration including the terminal portion 1 with the conduit 60 is illustrated. The method 600 includes step 601 of orienting the conduit 60 relative to the terminal portion 1. The conduit 60 may be aligned relative to the terminal portion 1 manually. The method also includes step 602 of disposing an end of the conduit 60 so as to align with an open end of the terminal portion 1. The method further includes step 603 of inserting the end of the conduit 60 into the open end of the terminal portion 1. The method additionally includes step 604 of pressing the end of the conduit 60 against a protection ring 20 disposed in the terminal portion 1 and pressing the end of the conduit 60 past an internal ring 35 and a sealing ring 25 disposed in the terminal portion 1. Pressing may be accomplished manually in at least one implementation. The method also includes step 605 of pressing the end of the conduit 60 against the protection ring 20 until the protection ring 20 is disposed against a closed end of the terminal portion 1. When assembled, the protection ring 20 is visible through one or more slots 48 in the sleeve 40 so as to indicate that the assembly has been correctly performed.

Figure 7:
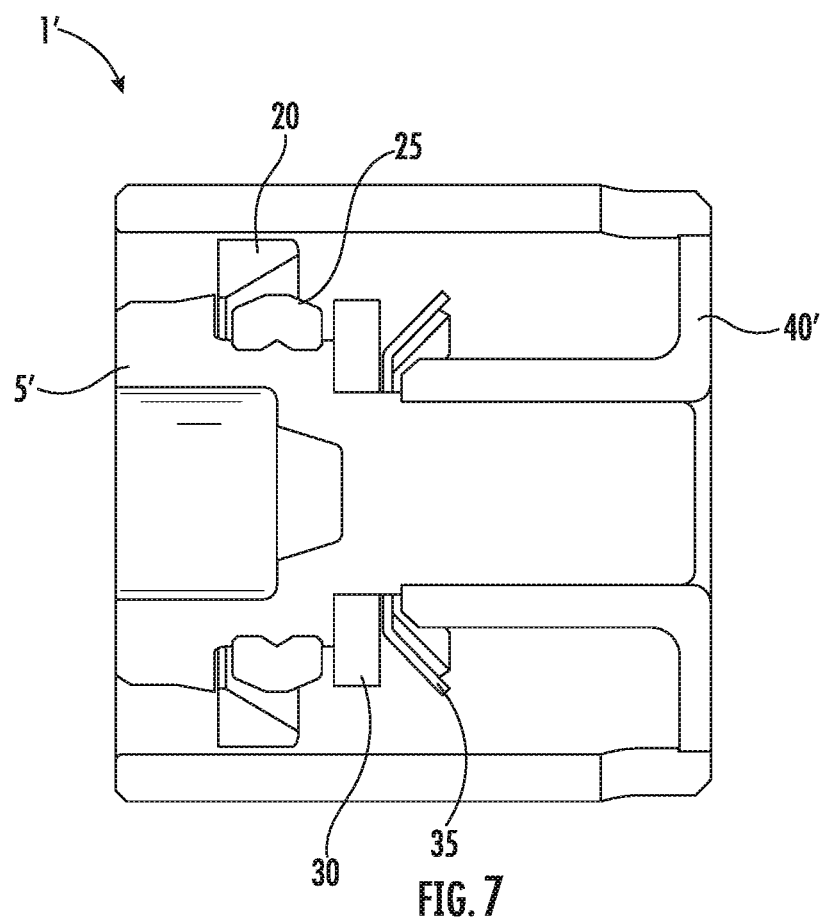
FIG. 7 is a side cross-sectional view of an end stop assembly, according to an exemplary implementation.

Referring now to FIGS. 7-9, another exemplary implementation of terminal portion 1 is shown. The exemplary implementation of the terminal portion 1 shown in FIGS. 7-9 is similar to the implementation shown in FIGS. 1-5 and described above except for the differences described below.

Figure 9A:
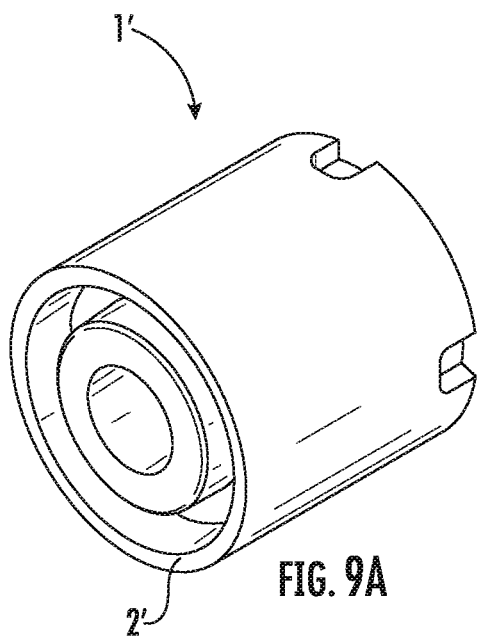
FIG. 9A is a rear perspective view of the end stop assembly shown in FIG. 7.
Figure 9B:
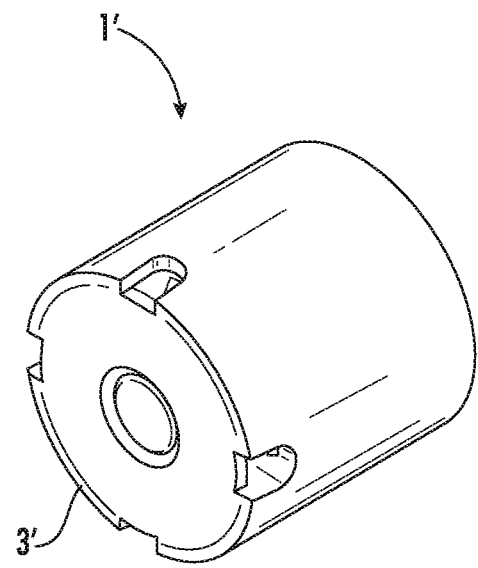
FIG. 9B is a front perspective view of the end stop assembly shown in FIG. 7.

As shown in FIG. 7, an exemplary implementation of a terminal portion 1' (e.g., a stopper or end stop) includes a body 5', a protection ring 20, a sealing ring 25, a spacer 30, an internal ring 35, and a sleeve 40'. An exploded assembly of the terminal portion 1' according to the exemplary implementation is shown in FIG. 8. The terminal portion 1', when assembled, includes a first, relatively open end 2' and a second, relatively closed end 3', as shown in FIGS. 9A and 9B. The structure of the terminal portion 1 and components thereof are described in more detail below.

Referring back to FIG. 8, the body 5' of the terminal portion 1 includes a first end 6' having a first diameter 7' and a second end 8' having a second diameter 9'. According to one aspect of the body 5', the first diameter 7' of the first end 6' is narrower (i.e., smaller) than the second diameter 9' of the second end 8'. The body 5' includes a body ramp 14' which is configured to receive and support the sealing ring 25 and thereby provide a seal on an inside of the conduit 60 (shown in FIG. 5) when an end 61 (shown in FIG. 6A) of the conduit 60 is inserted into the terminal portion 1', for example, by inserting the end 61 of the conduit 60 into the terminal portion 1' such that the end 61 of the conduit 60 is inserted over and around the second end 8' of the body 5'. According to one aspect, the body 5' also includes portion 11' having a taper 12' which extends from the body step 10' to the first end 6' of the body 5', along a longitudinal direction of body 5'.

As described above, the protection ring 20 is configured to compress the sealing ring 25 when the conduit 60 is inserted into the terminal portion 1' and thereby provide a barrier to protect against contamination. The protection ring 20 is further configured to provide an indicator when the fitting is fully inserted into the terminal portion 1'. For example, the protection ring 20 is colored (e.g., colored with a bright color) to allow for easy visualization of location of the protection ring 20 in the terminal portion 1' and thereby indicate an installation state of the terminal portion 1' on the conduit 60. That is, visual inspection of the protection ring 20 readily reveals whether the terminal portion 1' is correctly installed. The protection ring 20 includes a chamfer 21 which is configured to compress the sealing ring 20 when the end 61 of the conduit 60 is inserted into the terminal portion 1'. Accordingly, because the protection ring 20 includes chamfer 21, there is no need to provide a chamfer on the end 61 of the conduit 60 when inserting the end 61 into the terminal portion 1'.

When the conduit 60 is inserted into the terminal portion 1', the conduit 60 pushes on the protection ring 20 such that when protection ring 20 comes into contact with the sealing ring 25, the sealing ring 25 is compressed, as described above. Further, when the sealing ring 25 is compressed, end 61 of the conduit 60 passes over the sealing ring 25, thereby providing a seal on the end 61. Accordingly, the sealing ring 25 is disposed on the body step 10' of the body 5', thereby providing a seal to the end 61 of the conduit 60 when it is inserted into the terminal portion 1'. The spacer 30 is configured to position the sealing ring 25 in relation to the internal ring 35. The spacer 30 includes a hollow inner portion configured to be arranged over the diameter 7' of the first end 6' of the body 5'.

The internal ring 35 is configured to hold (e.g., grab) the conduit 60 such that the conduit 60 is held and remains fixed within the terminal portion 1'. Specifically, the internal ring 35 is configured to grip the conduit 60 on an inner diameter of the conduit 60 rather than on an outer diameter of the conduit 60. Configuring the internal ring 35 to grip the conduit 60 on an inner diameter of the conduit 60 allows the internal ring 35 to be formed with a relatively smaller diameter, thereby allowing the overall size of the terminal portion 1' to be smaller and reducing material costs. The internal ring 35 includes a first end 36 configured to rest against the spacer 30, so as to be flush or substantially flush against the spacer 30. The internal ring 35 also includes a plurality of protrusions 37 on an opposite end of the internal ring 35.

The plurality of protrusions 37 are configured to grip an inner surface or diameter of the conduit 60 such that the conduit 60 is held in place relative to the terminal portion 1' by the plurality of protrusions 37 of internal ring 35. In one example, the internal ring 35 is a grab ring. The internal ring 35 also includes a hollow inner portion which is configured to rest on the end 6 of the body 5. The internal ring 35 is made of any suitable material, for example, stainless steel.

Sleeve 40' (which may also be referred to herein as an external tube liner or retainer) is configured to house the body 5', the protection ring 20, the sealing ring 25, the spacer 30, and the internal ring 35. The sleeve 40' is further configured to house the end 61 of the conduit 60 in a hollow portion 44' of the sleeve 40'. The sleeve 40' is configured to be disposed concentrically over or around the body 5', the protection ring 20, the sealing ring 25, the spacer 30, and the internal ring 35, by indicating an installation state.

The sleeve 40' includes a first end 41' configured to receive and house the body 5', the protection ring 20, the sealing ring 25, the spacer 30, the internal ring 35, and the end 61 of the conduit 60. The first end 41' is adjacent to the inner hollow portion 44' of the sleeve 40'. The sleeve 40' also includes a second end 42'. According to one aspect, the second end 42' of the sleeve 40' is closed by outer wall 43', except for a plurality of slots 48' in the wall 43'. The plurality of slots 48' are configured to allow for easy visualization of the location of the protection ring 20 within the sleeve 40' to verify whether the conduit 60 has been successfully installed in the terminal portion 1'.

The sleeve 40' also includes inner sleeve 45' which defines an inner cavity 46'. The inner sleeve 45' is configured to house the body 5' using an interference fit between the body 5' and the inner sleeve 40'. Due to the interference fit, the sleeve 40' holds the body 5' securely in place in the sleeve 40' when the terminal portion 1' is assembled. The inner sleeve 45' is also configured to hold the internal ring 35 in place on the body 5'. The inner sleeve 45' also defines portion 44a' of inner hollow portion 44'. The portion 44a' is defined by an outer surface of the inner sleeve 45' and an inner surface of sleeve 40'. The portion 44a' is configured to receive and hold the end 61 of the conduit 60 and the protection ring 20 when the end 61 of the conduit 60 is inserted into the terminal portion 1' during the rough plumbing process. The portion 44a' is positioned so as to extend along a top and a bottom of the inner cavity 46', and along a first lateral side of the inner cavity 46' which is opposite to a second lateral side of the inner cavity 46' facing the wall 43'. The sleeve 40' is made of any suitable material. For example, the sleeve 40' is made of molded plastic. In at least one implementation, the sleeve 40' is made of PEX.

Figure 10:
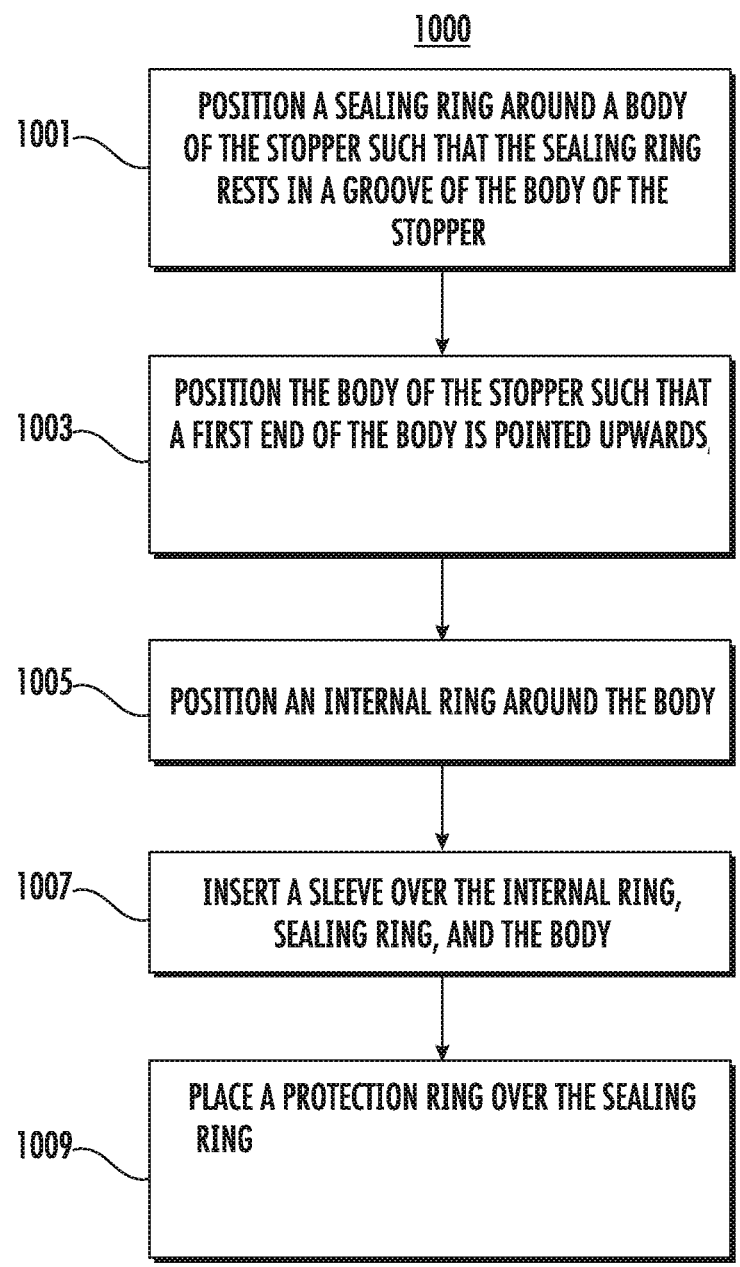
FIG. 10 is a diagram illustrating a method of assembling a stopper for a tubular member, according to an exemplary implementation.

As shown in FIG. 10, a method 1000 of assembling a terminal portion 1 for a tubular member includes step 1001 of positioning a sealing ring 25 around a body 5 of the terminal portion (e.g., stopper) 1 such that the sealing ring 25 rests in a groove 15 of the body 5 of the stopper 1. The method 1000 also includes the step 1003 of positioning the body 5 of the stopper 1 such that a first end 6 of the body 5 is pointed upwards, wherein the first end 6 of the body 5 is narrower than a second end 8 of the body 5. The method 1000 also includes the step 1005 of positioning an internal ring 35 around the body 5. The method 1000 also includes the step 1007 of inserting a sleeve 40 over the internal ring 35, sealing ring 25, and the body 5. The method 1000 also includes the step 1009 of placing a protection ring 20 over the sealing ring 25, the protection ring 20 including a chamfer 21 configured to receive the sealing ring 25. Optionally, the method 1000 also includes a step of positioning a spacer 30 over the sealing ring 25. According to one aspect of the method 1000, the sleeve includes an inner sleeve configured to house the body. According to another aspect of the method 1000, the protection ring is disposed between the body and the sealing ring. According to yet another aspect of the method 1000, the sleeve includes a plurality of slots configured to indicate an installation state of the stopper on the tubular member.

According to the method 1000, once the sealing ring 25 has been installed in the groove 15 of the body 5, the body 5 is placed into a fixture (not shown) with first end 6 of the body 5 facing upwards. The internal ring 35 is oriented with respect to the body portion 11 of the body 5 and placed over the barb 12a of the first end 6 of the body 5. The sleeve 40 is placed into the fixture so that the inner sleeve 45 of the sleeve 40 is centered over the body portion 11 of the body 5 and over the barb 12a of the first end 6 of the body 5. A downward force is applied to assemble the components together and create a snap fit between the barb 12a and the at least one sleeve step 49 disposed in the inner sleeve 45 of the sleeve 40. According to one aspect, the force acts on the abovementioned components to align and position the internal ring 35 within the terminal portion (e.g., stopper) 1, once the internal ring 35 is correctly oriented relative to the sleeve 40. The protection ring 20 is placed in the fixture (not shown) such that the chamfer 21 of the protection ring 20 faces upwards. The subassembly including the body 5, the sealing ring 25, the internal ring 35, and the sleeve 40 are positioned with the first, open end 41 facing downwardly over the protection ring 20. A downward force is applied to assemble the protection ring 20 in the sleeve 40.

Thus assembled, the protection ring 20 sits just behind the body ramp 14 of the body 5 and is located between the sealing ring 25 and the sleeve 40. The protection ring 20 is configured to protect the sealing ring 25 from being contaminated by foreign matter prior to installation of the fitting. The sealing ring 25 is located in groove 15 of the body 5 and is configured to seal the inside of the conduit 60 when the conduit 60 is installed in the terminal portion 1. The internal ring 35 is located on the body portion 11 and is held in place by the inner sleeve 45 of the sleeve 40.

Figure 11:
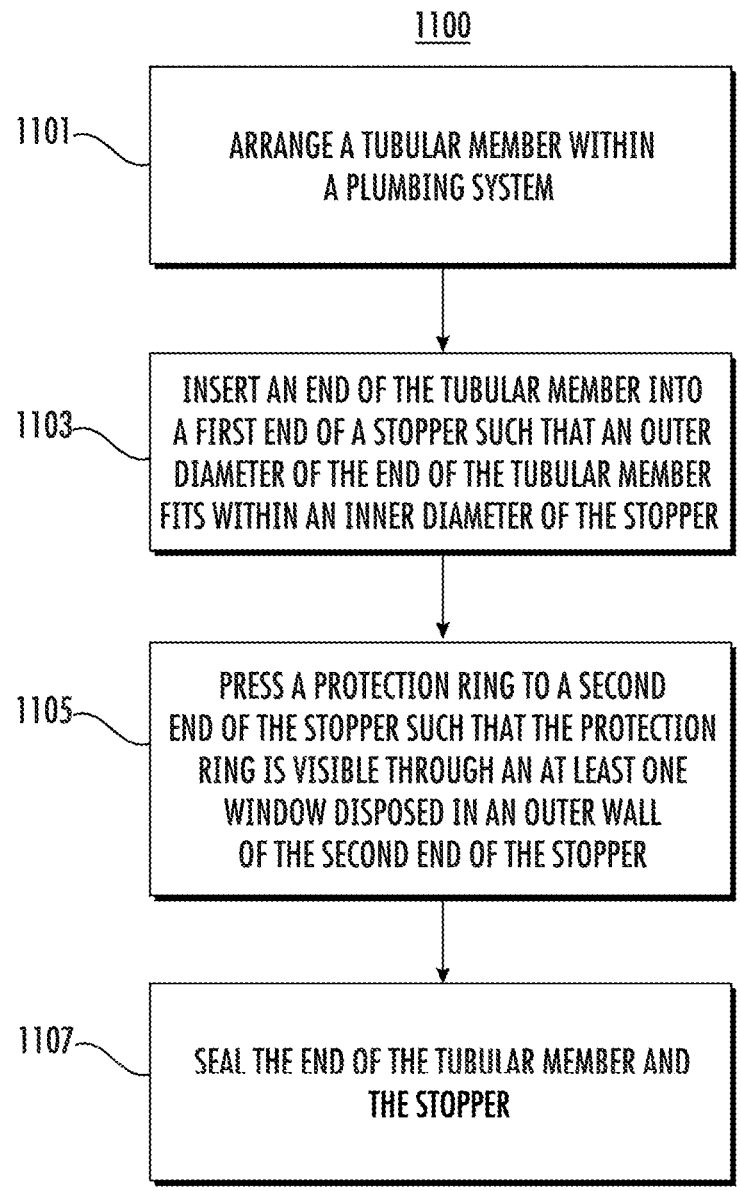
FIG. 11 is a diagram illustrating a method of assembling a stopper on an end of a tubular member in a plumbing system, according to an exemplary implementation.

As shown in FIG. 11, a method 1100 of assembling a stopper on an end of a conduit 60 in a plumbing system includes step 1101 of arranging the conduit 60 within the plumbing system. The method 1100 also includes step 1103 of inserting an end of the conduit 60 into a first end of the terminal portion 1 such that an outer diameter of the end of the conduit 60 fits within an inner diameter of the terminal portion 1. The method 1100 also includes step 1105 of pressing a protection ring 20 to a second end of the terminal portion 1 such that the protection ring 20 is visible through an at least one window disposed in an outer wall of the second end of the terminal portion 1. The method 1100 also includes step 1107 of sealing the end of the conduit 60 and the terminal portion 1. An internal ring 35 housed in the terminal portion 1 is configured to grip the end of the conduit 60 and prevent the conduit 60 from being removed from the terminal portion 1. The stopper also includes an inner sleeve having an outer diameter and configured to fit within an inner diameter of the tubular member. The sleeve is disposed concentrically around the body and the retainer. The protection ring 20 is configured indicate that the conduit 60 has been fully inserted into the terminal portion 1.

As mentioned above, the chamfer 21 of the protection ring 20 compresses the sealing ring 25 and allows the conduit 60 to easily ride over sealing ring 25, without a need to chamfer an inside surface of the conduit 60. The protection ring 20 is configured to travel inside the sleeve 40 while the conduit 60 is inserted into the terminal portion 1, past and over the internal ring 35 until the protection ring 20 rests against second end 42 of the sleeve 40. Once this occurs, the conduit 60 has been fully inserted into the terminal portion 1. The visual sighting of the protection ring 20 through the plurality of slots 48 in the sleeve 40 indicates to a user that the conduit 60 has been fully inserted into the terminal portion 1.

As utilized herein, the terms "approximately," "about," "substantially," and similar terms are intended to have a broad meaning in harmony with the common and accepted usage by those of ordinary skill in the art to which the subject matter of the disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected" and the like are used herein to mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the figures. It should be noted that the orientation of various elements may differ according to other exemplary implementations and that such variations are intended to be encompassed by the present disclosure.

With respect to the use of substantially any plural and/or singular terms herein, those having skill in the art can translate from the plural to the singular and/or from the singular to plural as is appropriate to the context or application. The various singular/plural permutations may be expressly set forth herein for clarity.

It is to be understood that although the present invention has been described with regard to certain implementations thereof, various other implementations and variants may occur to those skilled in the art, which are within the scope and spirit of the invention, and such other implementations and variants are intended to be covered by corresponding claims. Those skilled in the art will readily appreciate that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be changed according to alternative implementations. Other substitutions, modifications, changes, and omissions may also be made in the design, operating conditions and arrangement of the various exemplary implementations without departing from the scope of the present disclosure.

What is claimed is:

1. A terminal portion for sealing an end of a conduit, comprising:
   a body comprising
      a first end having a first diameter; and
      a second end having a second diameter, the first diameter being smaller than the second diameter;
   an internal ring disposed over and around the first end of the body, wherein the internal ring is configured to couple the terminal portion and the end of the conduit; and
   a sleeve disposed over the body and the internal ring, the sleeve being structured to contain an outer portion of the end of the conduit,
      the sleeve comprising at least one inner sleeve dimensioned to accommodate the first end of the body and be positioned within the conduit, the at least one inner sleeve housing the body,
      the sleeve comprising a portion dimensioned to accommodate the conduit.

2. The terminal portion according to claim 1, further comprising a sealing ring disposed within a groove of the body.

3. The terminal portion according to claim 2, further comprising a protection ring positioned between the body and the sleeve.

4. The terminal portion according to claim 3, wherein the protection ring is configured to compress the sealing ring when the terminal portion is installed on the end of the conduit.

5. The terminal portion according to claim 4, wherein the protection ring is further configured to isolate the sealing ring from an external environment.

6. The terminal portion according to claim 3, wherein the protection ring comprises a chamfered portion on one side, wherein the chamfered portion is configured to compress the sealing ring.

7. The terminal portion according to claim 1, wherein the internal ring comprises stainless steel.

8. The terminal portion according to claim 1, wherein the internal ring is configured to grip the end of the conduit along an inner diameter of the end of the conduit.

9. The terminal portion according to claim 1, wherein the sleeve comprises molded plastic.

10. The terminal portion according to claim 1, wherein the internal ring is formed as a split grab ring positioned in a groove on the body.

11. The terminal portion according to claim 1, wherein the at least one inner sleeve is configured to hold the internal ring in place on the body.

12. The terminal portion according to claim 1, wherein the sleeve comprises a plurality of slots configured to indicate an installation state of the terminal portion on the end of the conduit.

13. The terminal portion according to claim 1, wherein the first end of the body comprises at least one projection configured to engage with an inner protrusion disposed within the inner sleeve.

14. An assembly, comprising:
    a tubular member having an end portion, the end portion having an outer diameter and an inner diameter; and
    a stopper comprising
       a body;
       an internal ring provided concentrically with respect to the body, wherein the internal ring is configured to couple the stopper and the end portion of the tubular member; and
       a sleeve disposed over the body and the internal ring, the sleeve being configured to house therein the outer diameter of the end portion of the tubular member, and the sleeve being further configured to house the internal ring and the body,
       the sleeve comprising at least one inner sleeve dimensioned to be positioned within the tubular member.

15. The assembly according to claim 14, further comprising a sealing ring disposed between the body and the sleeve and positioned in a groove of the body of the stopper.

16. The assembly according to claim 15, further comprising a protection ring disposed between the body and the sleeve and housed in the sleeve.

17. The assembly according to claim 14, wherein the internal ring is configured as a split grab ring positioned in a groove on the body.

18. The assembly according to claim 17, wherein:
    the body comprises at least one projection, and
    the sleeve is provided with at least one extending structure configured to engage with the at least one projection of the body.

* * * * *